(12) United States Patent
Chang (10) Patent No.: US 6,309,540 B1
(45) Date of Patent: Oct. 30, 2001

(54) APPARATUS FOR SEPARATING SOLIDS FROM A LIQUID

(76) Inventor: Jiin-Lung Chang, No. 16-7, Kou-Tsao Lane, Kou-Tsao Li, Yuan-Lin Chen, Changhua Hsien (TW)

( * ) Notice: Subject to any disclaimer, the term of this patent is extended or adjusted under 35 U.S.C. 154(b) by 0 days.

(21) Appl. No.: 09/653,440

(22) Filed: Sep. 1, 2000

(51) Int. Cl.[7] .................................................. B01D 29/44
(52) U.S. Cl. ........................ 210/159; 210/162; 210/413
(58) Field of Search .................................. 210/159, 162, 210/413, 415

(56) References Cited

U.S. PATENT DOCUMENTS

| | | | |
|---|---|---|---|
| 1,143,496 | * | 6/1915 | Briles ..................................... 210/162 |
| 1,180,798 | * | 4/1916 | Spoon ................................... 210/162 |
| 1,801,111 | * | 4/1931 | Schofield et al. ..................... 210/159 |
| 3,615,012 | * | 10/1971 | Verbandt ............................... 210/159 |
| 4,155,841 | * | 5/1979 | Chupka et al. ........................ 210/415 |
| 4,220,540 | * | 9/1980 | Hagihara ............................... 210/415 |
| 4,969,992 | * | 11/1990 | Nääppä .................................. 210/159 |
| 5,152,891 | * | 10/1992 | Netkowicz et al. .................. 210/415 |
| 5,676,829 | * | 10/1997 | Cotterill ............................... 210/159 |

* cited by examiner

Primary Examiner—Christopher Upton
(74) Attorney, Agent, or Firm—Trop, Pruner & Hu, P.C.

(57) ABSTRACT

An apparatus for separating solids from a liquid includes a housing with two spaced-apart side walls, a plurality of parallel looped barrier members disposed side-by-side between the side walls for trapping solid matter, a circulating unit, a driving source unit for activating the circulating unit, and a plurality of moving plates mounted on the circulating unit and moved by the circulating unit along a looped path. The barrier members are spaced-apart from one another so as to define a plurality of looped pathways among adjacent pairs of the barrier members. Each moving plate extends into and moves along a respective one of the looped pathways when the driving source unit is activated so as to remove the solid matter from the barrier members.

8 Claims, 7 Drawing Sheets

APPARATUS FOR SEPARATING SOLIDS FROM A LIQUID

BACKGROUND OF THE INVENTION

1. Field of the Invention

The present invention relates to an apparatus for separating solids from a liquid, more particularly to one that includes a plurality of barrier members for trapping solid matter in wastewater, and a plurality of moving plates extending among adjacent pairs of the barrier members for removing the solid matter from the barrier members.

2. Description of the Related Art

Figure 1:
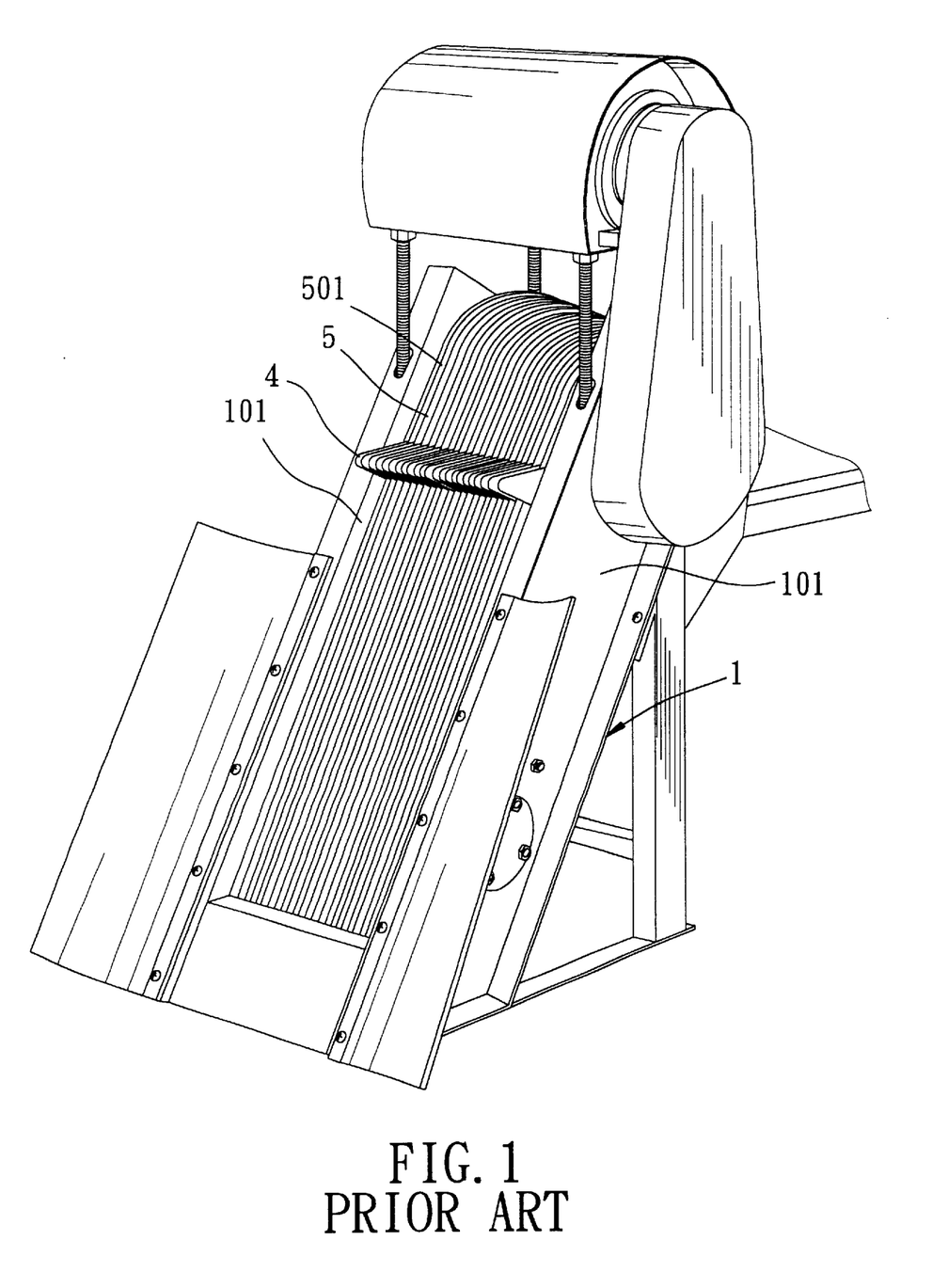
FIG. 1 is a perspective view illustrating a conventional apparatus for separating solids from a liquid.
Figure 2:
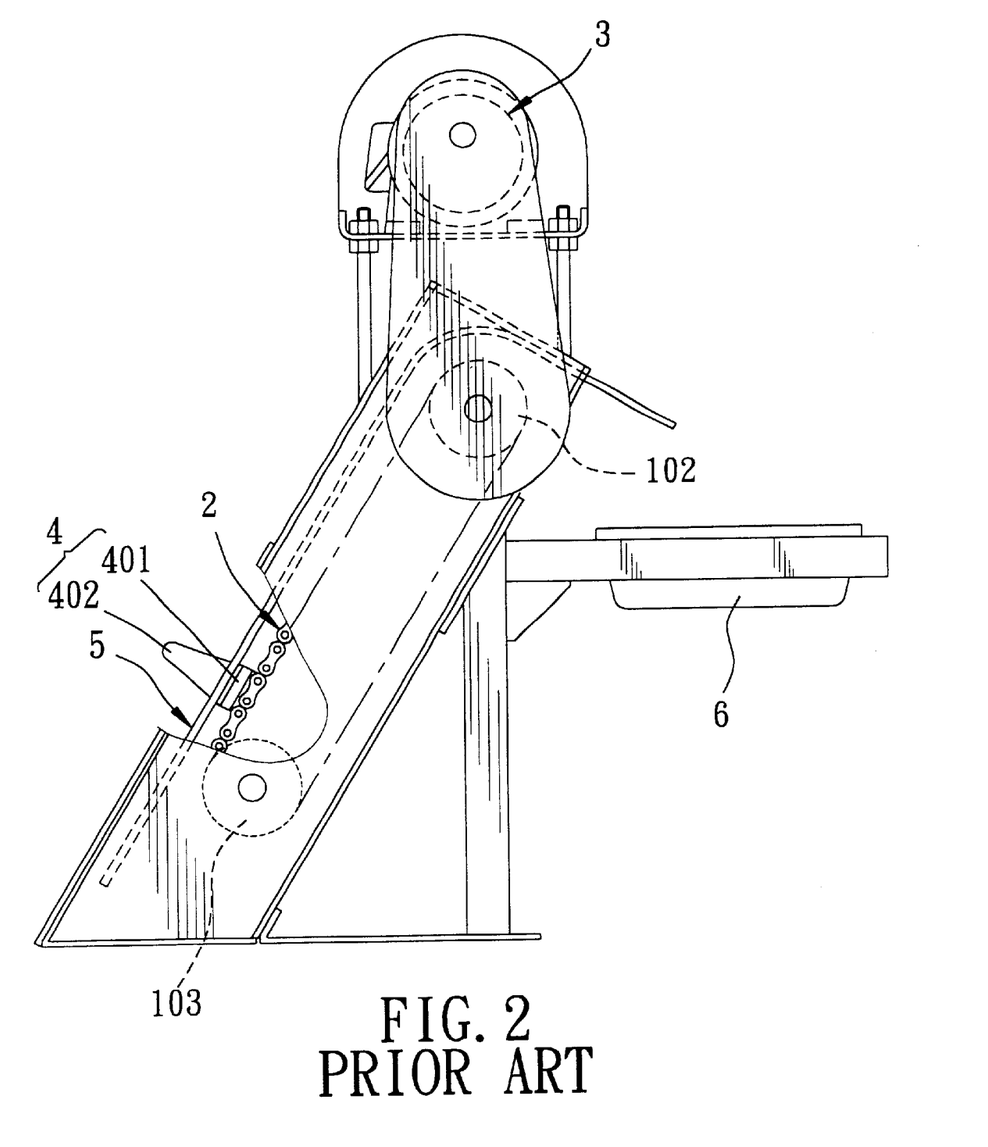
FIG. 2 is a schematic side view illustrating the conventional apparatus.

Conventionally, a wastewater channel of a factory, such as a food factory, is generally installed with an apparatus for separating solid substances from the wastewater before the wastewater is drained to a river. FIGS. 1 and 2 illustrate a conventional separating apparatus for separating solids from a liquid. The apparatus includes a housing 1 having inclined left and right side walls 101. A plurality of barrier members 5 are disposed side-by-side between the side walls 101 in a parallel relationship with one another for trapping solid matter in the wastewater when the wastewater is introduced into the housing 1. The barrier members 5 are spaced-apart from one another so as to define a plurality of parallel pathways 501 among adjacent pairs of the barrier members 5. A pair of upper driving sprockets 102 and a pair of lower driving sprockets 103 are mounted on the side walls 101. Endless left and right chains 2 are trained on the upper and lower sprockets 102, 103. A plurality of moving plates 4 have base portions 401 mounted securely on the chains 2 and distal portions 402 extending respectively into the pathways 501. The moving plates 4 are aligned with one another in a direction transverse to the side walls 101, and move with the chains 2 when the driving sprockets 102, 103 are activated by a motor 3 for removing the solid matter trapped by the barrier members 5. A collector 6 is disposed below an upper end of the housing 1 for receiving the solid matter removed from the barrier members 5. As shown, the barrier members 5 are generally L-shaped. The pathways 501 thus have open upper ends formed at upper end portions of adjacent pairs of the barrier members 5, and open lower ends formed at lower end portions of adjacent pairs of the barrier members 5. The moving plates 4 are moved out of the pathways 501 via the open upper ends when circulating with the chains 2 to the upper section of the housing 1, and are then inserted into the pathways 501 via the open lower ends when circulating with the chains 2 to the lower section of the housing 1.

In use, the moving plates 4 might collide with the barrier members 5 while being inserted into the pathways 501 via the open lower ends. The collision as such can result in serious damage to the apparatus and even breakdown of the apparatus. This problem is aggravated when the routes of the moving plates 4 deviate from the pathways 501, such as when a huge solid mass is trapped by the barrier members 5 and causes the barrier members 5 to deform. As such, a sufficient space must be maintained between adjacent pairs of the barrier members 5, preferably in the range of 5~20 mm, to prevent collision among the moving plates 4 and the barrier members 5 in order to ensure smooth operation of the apparatus. In addition, to prevent deformation of the barrier members 5, the barrier members 5 must have a sufficient rigidity and a sufficient thickness. Moreover, the barrier members 5 have wedge-shaped cross-sections to facilitate insertion of the moving plates 4 into the pathways 501. Formation of the barrier members 5 with the wedge-shaped cross-sections complicates the manufacturing process.

SUMMARY OF THE INVENTION

Therefore, the main object of the present invention is to provide a separating apparatus of the aforementioned type capable of overcoming the above-described problems.

Accordingly, the apparatus of the present invention includes a housing, a plurality of looped barrier members, a circulating unit mounted on the housing, a driving source unit for activating the circulating unit, and a plurality of moving plates. The housing has two side walls which are spaced-apart from each other. The looped barrier members are disposed side-by-side in a parallel relationship with one another between the side walls, and are spaced-apart from one another so as to define a plurality of looped pathways among adjacent pairs of the barrier members. The barrier members are adapted to trap solid matter in wastewater thereamong when the wastewater is introduced into the housing. The moving plates are mounted on the circulating unit and are moved by the circulating unit along a looped path. Each of the moving plates extends into and is moved along a respective one of the looped pathways when the driving source unit is activated so as to be adapted to remove the solid matter from the barrier members.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 3:
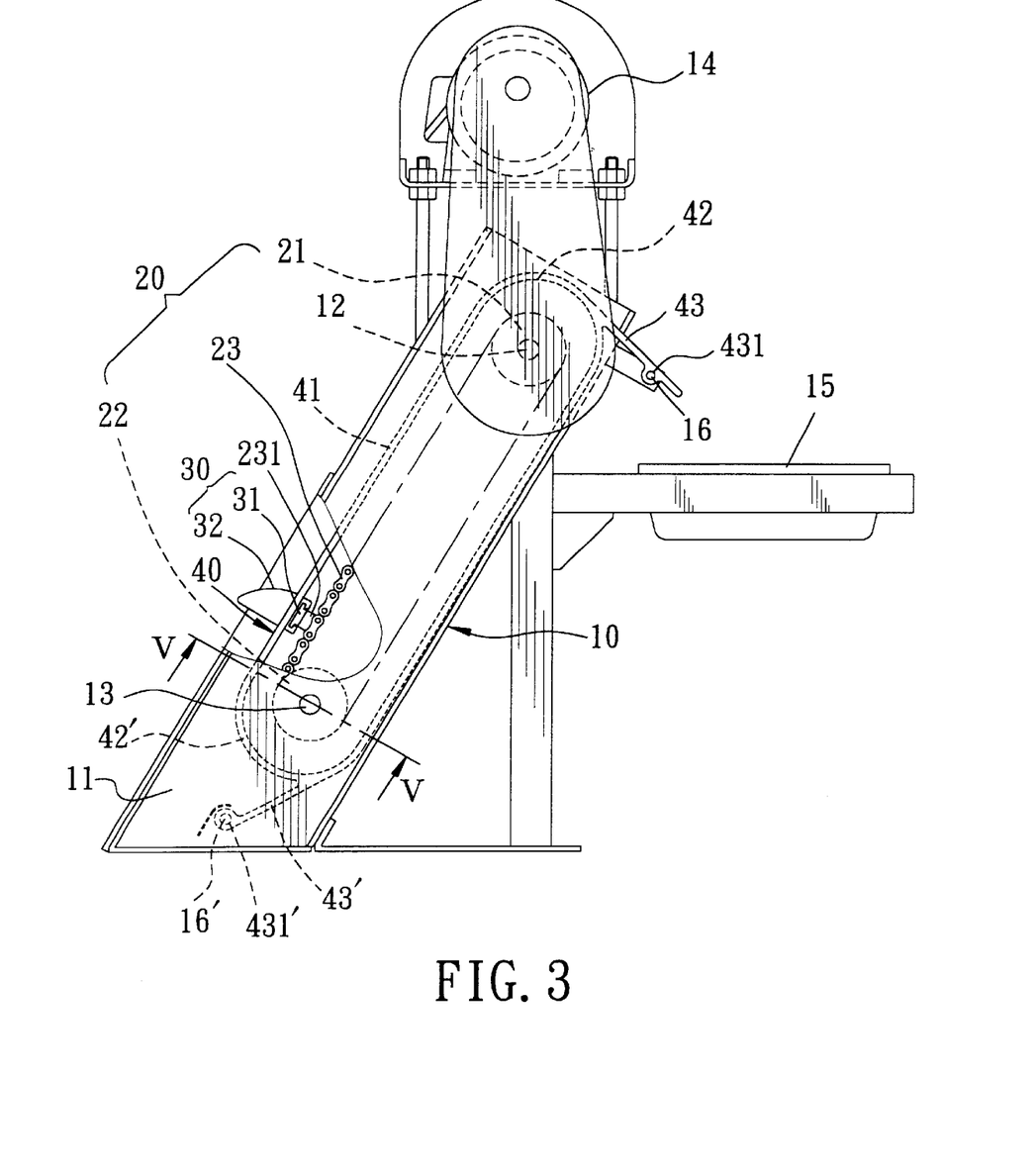
FIG. 3 is a schematic side view illustrating a first preferred embodiment of the apparatus of the present invention.

Referring to FIG. 3, the first preferred embodiment of the apparatus of the present invention is shown to include a housing 10 having left and right side walls 11, a plurality of barrier members 40, a driving source unit 14, a circulating unit 20, and a solid removing unit 30.

The housing 10 has a lower section adapted to be immersed in a wastewater channel (not shown), and an upper section adapted to extend out of the wastewater channel. The side walls 11 incline rearwardly from the lower section to the upper section. A solid collecting unit 15 is disposed below an upper end of the upper section. An upper sprocket axle 12 is disposed in the upper section of the housing 10, and extends transversely between the side walls 11. A lower sprocket axle 13 is disposed in the lower section of the housing 10, and extends transversely between the side walls 11.

The circulating unit 20 includes a pair of upper driving sprockets 21 disposed adjacent to the side walls 11 and mounted rotatably on the upper sprocket axle 12, a pair of lower driving sprockets 22 disposed adjacent to the side walls 11 and mounted rotatably on the lower sprocket axle 13, and a pair of endless chains 23, each of which is trained on a respective one of the upper driving sprockets 21 and a respective one of the lower driving sprockets 22. The driving source unit 14 is in the form of a motor, and is mounted above the upper end of the housing 10 for driving rotation of the upper and lower driving sprockets 21, 22 about axes of the upper and lower sprocket axles 12, 13, respectively.

Figure 4:
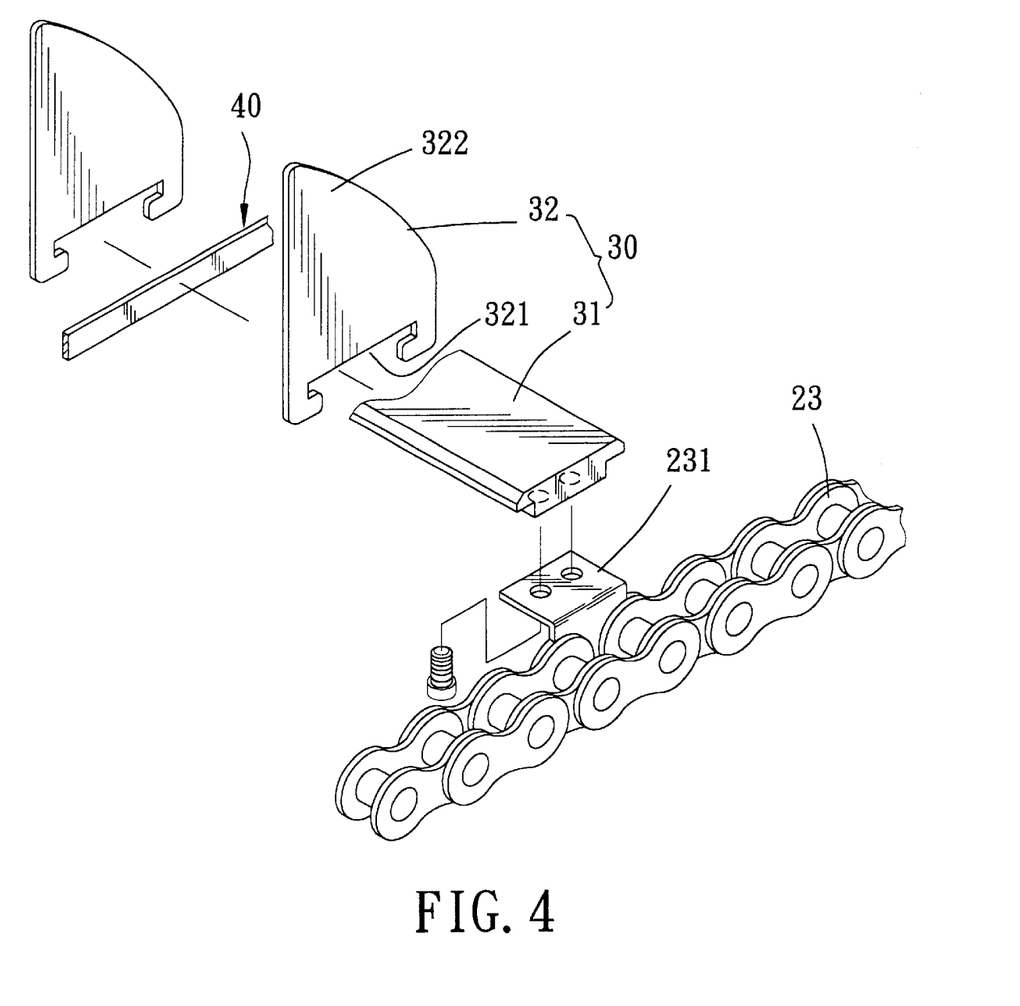
FIG. 4 is a fragmentary exploded perspective view of the first preferred embodiment.
Figure 5:
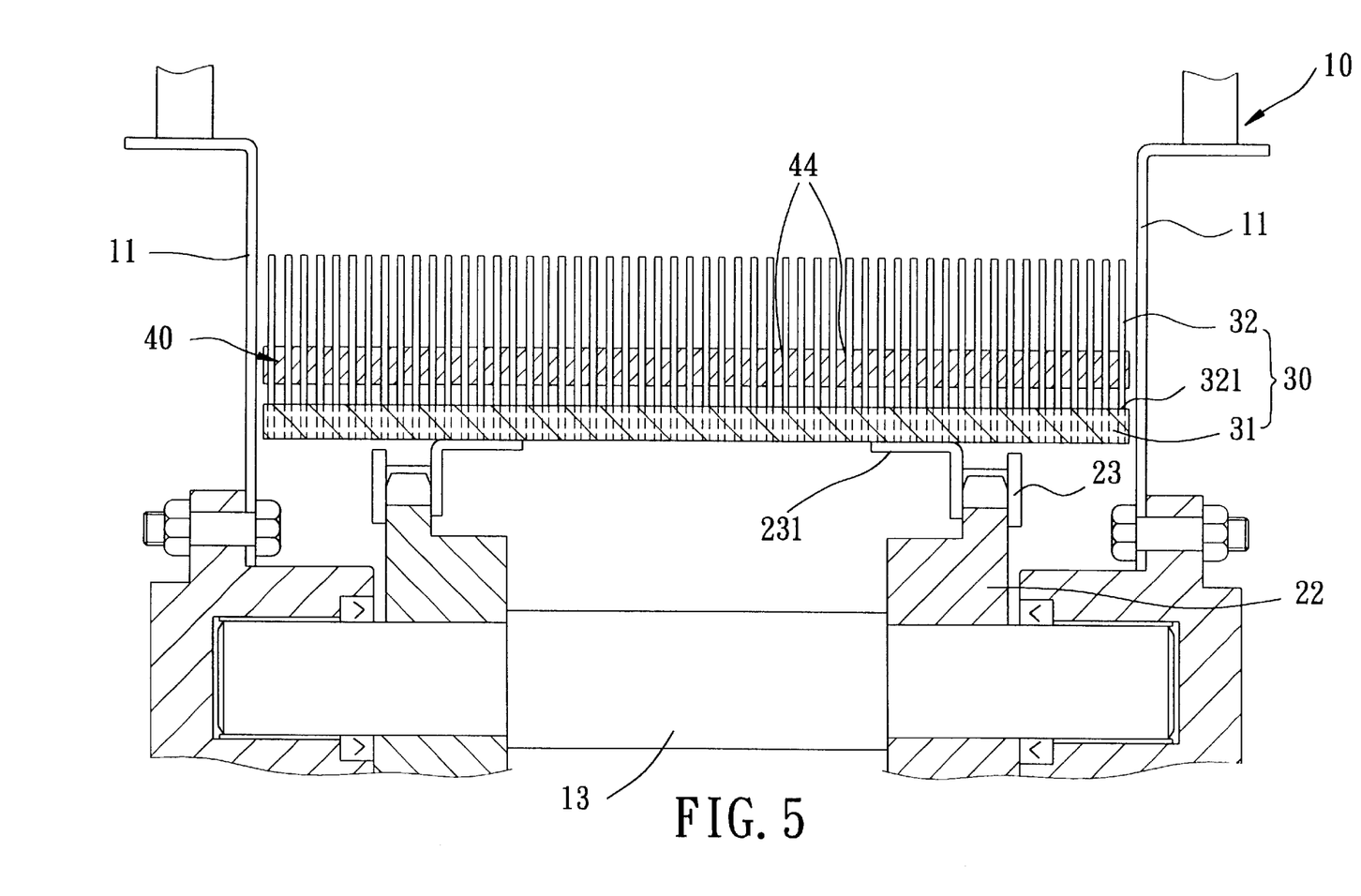
FIG. 5 is a cross-sectional view of the first preferred embodiment, taking along line V—V in FIG. 3.

Referring to FIGS. 3 to 5, each of the barrier members 40 is formed integrally from a plastic material, and includes a generally oval-shaped elongated looped portion, and upper and lower mounting arm portions 43, 43' extending out of the looped portion. The looped portion extends to surround the upper and lower driving sprockets 21, 22 and the chains 23, and has parallel longitudinal sections 41, and upper and lower curved sections 42, 42' interconnecting the longitudinal sections 41. The upper mounting arm portion 43 extends rearwardly and integrally from the upper curved section 42. The lower mounting arm portion 43' extends forwardly and integrally from the lower curved section 42'. The barrier members 40 are disposed side-by-side between the side walls 11 in a parallel relationship with one another. The upper mounting arm portions 43 are formed with aligned upper mounting holes 431 for extension of an upper mounting rod 16 therethrough. The lower mounting arm portions 43' are formed with aligned lower mounting holes 431' for extension of a lower mounting rod 16' therethrough. The mounting rods 16, 16' are secured to the housing 10, and have a plurality of spacer rings (not shown) sleeved thereon and disposed among adjacent pairs of the barrier members 40 for spacing the barrier members 40 apart from one another so as to define a plurality of looped pathways 44 among the looped portions of adjacent pairs of the barrier members 40.

The solid removing unit 30 includes an elongated mounting strip 31 bridging the chains 23, and a plurality of moving plates 32 engaging the mounting strip 31. The mounting strip 31 is disposed within the looped portions of the barrier members 40, and has a generally T-shaped cross-section and left and right end portions which are fastened to a pair of fastening plates 231 that are secured to the chains 23. The moving plates 32 are perpendicular to the mounting strip 31. Each of the moving plates 32 has a wider base portion formed with a T-shaped engaging groove 321 for engaging fittingly the mounting strip 31, and a converging distal portion 322 opposite to the base portion and extending into a respective one of the looped pathways 44. The moving plates 32 are aligned with one another in a direction transverse to the side walls 11.

When the driving source unit 14 is activated to drive axial rotation of the sprockets 21, 22, the moving plates 32 move with the chains 23 and circulate within the looped pathways 44 for removing solid matter trapped by the barrier members 40. The solid matter removed from the barrier members 40 are collected in the solid collecting unit 15.

As the barrier members 40 define looped pathways 44 thereamong, the moving plates 32 are always kept within the looped pathways 44 when circulating with the chains 23, thereby avoiding the problem of collision with the barrier members encountered in the aforementioned prior art. The barrier members 40 can thus be made thinner and be arranged closer to one another to increase the treatment efficiency of the apparatus.

Figure 6:
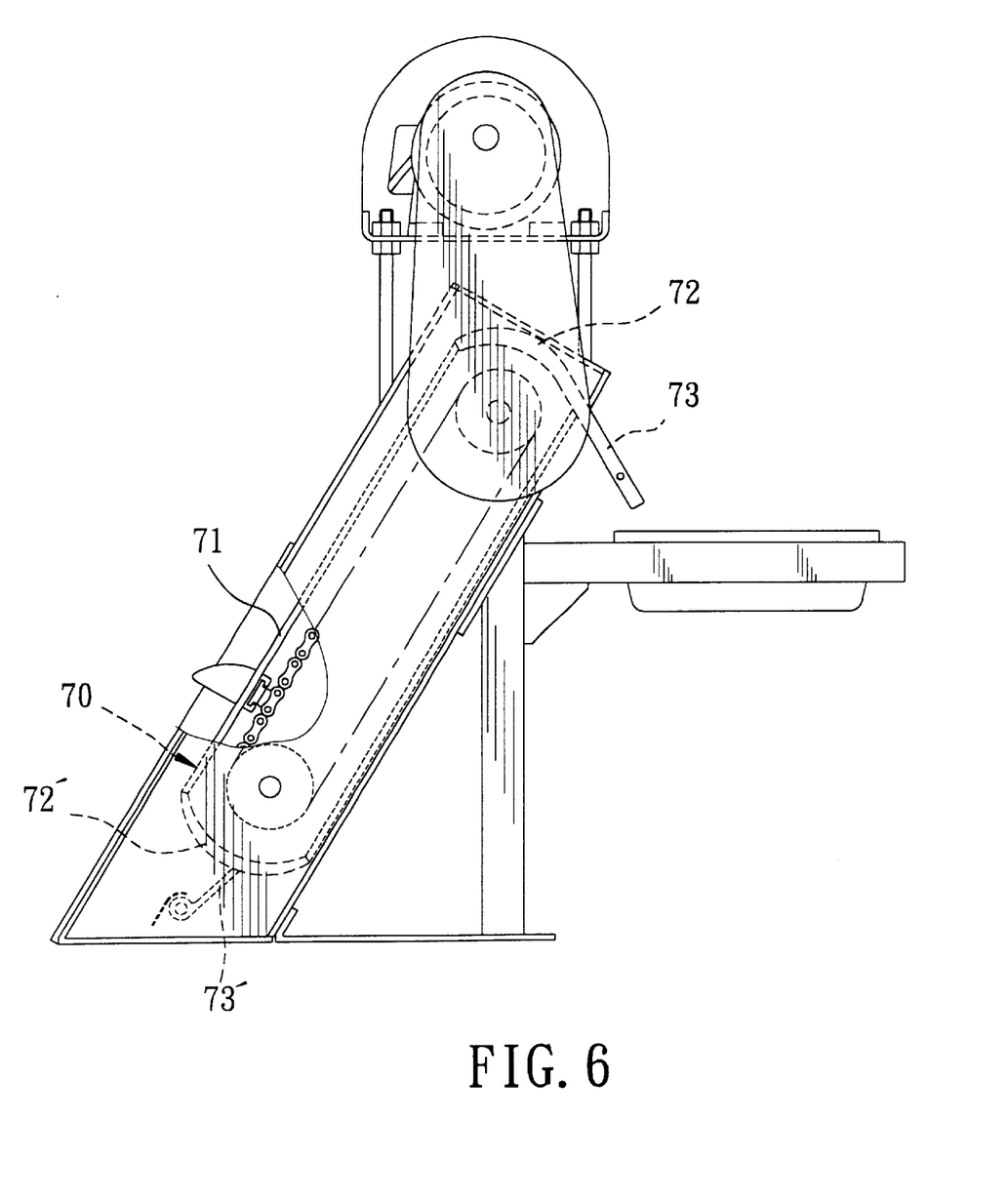
FIG. 6 is a schematic side view illustrating a second preferred embodiment of the apparatus of the present invention.

Referring to FIG. 6, in the second preferred embodiment, the barrier members 70 are formed from stainless steel. The looped portion of each of the barrier members 70 includes parallel longitudinal sections 71 and upper and lower curved sections 72, 72' welded to the longitudinal sections 71 for interconnecting the same. An upper mounting arm 73 extends from the upper curved section 72, and a lower mounting arm 73' is secured to the lower curved section 72'. Operation of the apparatus of the present embodiment is similar to that of the previous embodiment, and will not be described in further detail herein.

Figure 7:
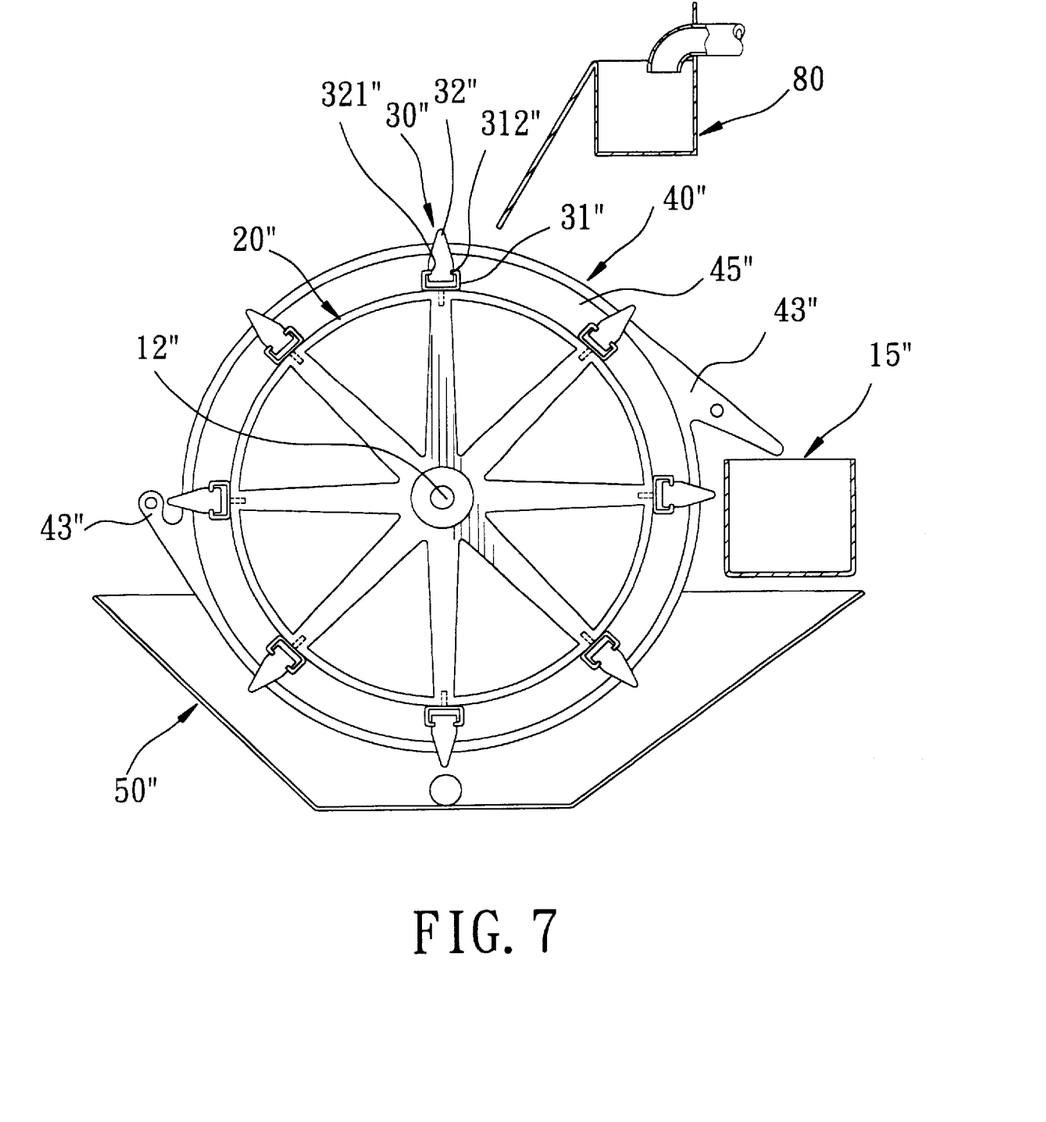
FIG. 7 is a schematic side view illustrating a third preferred embodiment of the apparatus of the present invention.

Referring to FIG. 7, in the third preferred embodiment, the circulating unit includes a rotary wheel 20" having a rotary axle 12". A feeding unit 80 is disposed above the rotary wheel 20" for supplying wastewater. A reservoir tank 50" is disposed below the rotary wheel 20" for receiving the wastewater. Each of the barrier members 40" (only one is shown in FIG. 7) has a looped portion which is circular in shape and which surrounds the rotary wheel 20", and front and rear mounting arm portions 43" extending from the looped portion. The barrier members 40" are disposed side-by-side in a parallel relationship with one another, and are spaced-apart from one another so as to define a plurality of looped pathways 45" among adjacent pairs of the barrier members 40" and around the rotary wheel 20". The solid removing unit 30" includes a plurality of mounting seats 31" secured to an outer periphery of the rotary wheel 20", and a plurality of moving plates 32" engaging the mounting seats 31" and extending into the looped pathways 45" for removing solid matter from the barrier members 40". Each of the moving plates 32" has a base portion formed with a pair of engaging grooves 321" for engaging a pair of engaging projections 312" of one of the mounting seats 31". The solid matter removed from the barrier members 40" are collected in a solid collecting unit 15" disposed adjacent to the rotary wheel 20".

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An apparatus for separating solids from a liquid comprising:

a housing having two side walls that are spaced-apart from each other;

a plurality of looped barrier members that are disposed side-by-side in a parallel relationship with one another between said side walls and which are spaced-apart from one another so as to define a plurality of looped pathways among adjacent pairs of said barrier members, said barrier members being adapted to trap solid matter in wastewater thereamong when the wastewater is introduced into said housing;

a circulating unit mounted on said housing;

a driving source unit for activating said circulating unit;

a plurality of moving plates mounted on said circulating unit and moved by said circulating unit along a looped path, each of said moving plates extending into and moving along a respective one of said looped pathways when said driving source is activated so as to be adapted to remove the solid matter from said barrier members;

a pair of upper driving sprockets mounted rotatably on said side walls about an upper rotary axis transverse to said side walls;

a pair of lower driving sprockets mounted rotatably on said side walls about a lower rotary axis parallel to and disposed at a height lower than said upper rotary axis; and a parallel pair of endless chains, each of which is trained on a respective one of said upper driving sprockets and a respective one of said lower driving sprockets;

said apparatus further comprising an elongated mounting strip bridging said chains and mounted securely on said chains for moving together with said chains, said moving plates being mounted on said mounting strip.

2. The apparatus as claimed in claim 1, wherein said moving plates are aligned with one another in a direction transverse to said side walls.

3. The apparatus as claimed in claim 1, wherein each of said moving plates has a base portion formed with an engaging groove for engaging said mounting strip, and a distal portion opposite to said base portion and extending into the respective one of said looped pathways.

4. The apparatus as claimed in claim 3, wherein said engaging groove is generally T-shaped, and said mounting strip has a generally T-shaped cross-section.

5. The apparatus as claimed in claim 1, wherein each of said barrier members has an elongated looped portion that extends to surround said upper and lower driving sprockets and said chains.

6. The apparatus as claimed in claim 5, wherein said looped portion has upper and lower sections, each of said barrier members further having an upper mounting arm portion extending from said upper section of said looped portion and mounted on said housing, and a lower mounting arm portion extending from said lower section of said looped portion and mounted on said housing.

7. The apparatus as claimed in claim 6, wherein each of said barrier members is formed integrally from a plastic material.

8. The apparatus as claimed in claim 6, wherein said upper mounting arm portions of said barrier members are formed with aligned upper mounting holes, said lower mounting arm portions of said barrier members being formed with aligned lower mounting holes, said housing further having an upper mounting rod extending through said upper mounting holes, and a lower mounting rod extending through said lower mounting holes.

\* \* \* \* \*